United States Patent [19]

Mučić

[11] Patent Number: 4,594,857
[45] Date of Patent: Jun. 17, 1986

[54] RESORPTION-TYPE THERMAL CONVERSION APPARATUS

[75] Inventor: Vinko Mučić, Walldorf, Fed. Rep. of Germany

[73] Assignee: TCH Thermo-Consulting-Heidelberg GmbH, Heidelberg, Fed. Rep. of Germany

[21] Appl. No.: 768,115
[22] PCT Filed: Dec. 5, 1984
[86] PCT No.: PCT/EP84/00388
§ 371 Date: Aug. 9, 1985
§ 102(e) Date: Aug. 9, 1985
[87] PCT Pub. No.: WO85/02669
PCT Pub. Date: Jun. 20, 1985

[30] Foreign Application Priority Data

Dec. 9, 1983 [DE] Fed. Rep. of Germany ....... 3344599

[51] Int. Cl.$^4$ .............................................. F25B 15/00
[52] U.S. Cl. .................................... 62/141; 62/324.2; 62/476
[58] Field of Search ................. 62/141, 476, 324.2

[56] References Cited

U.S. PATENT DOCUMENTS

| | | | |
|---|---|---|---|
| 3,837,174 | 9/1974 | Miyagi et al. | 62/141 |
| 4,394,959 | 7/1983 | de Vries | 62/324.2 X |
| 4,448,596 | 5/1984 | van der Sluys et al. | 62/324.2 X |
| 4,487,026 | 12/1984 | Alfano | 62/141 X |
| 4,526,009 | 7/1985 | van der Sluys et al. | 62/476 X |

*Primary Examiner*—Lloyd L. King

[57] ABSTRACT

Heat pumps, refrigeration machines, heat transformers and the like which function on the resorption principle using a binary working medium, especially a mixture of ammonia and water, operate with two solvent circuits in which the working medium that is in the liquid phase is raised from a lower to a higher pressure level and expanded back to the lower pressure level, an interconnecting conduit existing between the solvent circuits on the low-pressure side and high-pressure side in which vaporous working medium is exchanged. To compensate for differences occurring during operation in the volume and concentration of the working medium in the two circuits, a compensating conduit for flowing liquid working medium of different concentration is provided parallel to one of the two conduits for the vaporous working medium. The volumetric flow of the liquid working medium flowing in the compensating conduit is regulated from a central computer unit in accordance with the concentrations of the vaporous working medium flowing in the conduits between the solvent circuits and the volume of the vaporous working medium flowing in one of the conduits, and the concentration of the liquid working medium flowing in the compensating conduit.

3 Claims, 4 Drawing Figures

RESORPTION-TYPE THERMAL CONVERSION APPARATUS

The invention relates to resorption-type thermal conversion apparatus, such as heat pumps, refrigeration machines or thermal transformers, which are operated with a binary working medium, especially a mixture of ammonia and water, for the purpose of raising thermal energy supplied from an external thermal energy source to a higher temperature level, the apparatus having two solvent circuits in which the liquid-phase working medium is brought from a lower to a higher pressure level and expanded again to the lower pressure level, and one interconnecting conduit exists between the two circuits on the low-pressure side and one on the high-pressure side in which working medium that is in the vapor phase passes over.

Such resorption-type thermal conversion apparatus operated with a mixture of ammonia and water as the working medium can be used, for example, as heat pumps with which thermal energy at a relatively low temperature level is withdrawn from the surrounding milieu, such as the ambient atmosphere, bodies of water or the earth, and is raised to a higher temperature level at which it is then available for heating purposes, such as the heating of utility water or the like.

If, on the other hand, thermal energy is already available at a higher temperature level, e.g., in manufacturing processes in the form of exhaust vapor or steam, this energy can be raised by so-called heat transformers to such a temperature level that it can be utilized again in the manufacturing process as processing heat.

The continuous operation of such apparatus requires that the volumetric difference in the vaporous working medium flowing on the high- and low-pressure side between the two circuits of the apparatus be compensated, also with regard to the individual components of the binary mixture. In the known apparatus (Handbuch der Kaeltetechnik, vol. 7, R. Plank, Verlag Springer, 1959, pp. 7-19) this problem is solved by the fact that the working medium is exchanged both on the high-pressure and on the low-pressure side in equal amounts and equal concentration, exclusively in vaporous form, the concentration matching requiring the use of a rectification column in the branch in which, without such rectification, as a result of the manner in which the circuit in question is operating, a vaporous binary mixture would be exchanged which has a higher content of the higher-boiling component than is found in the vaporous phase emerging from the other circuit. The need for the use of such a rectification column and the regulation of its operation so as to deliver continuously a vaporous binary mixture whose concentration and volume correspond precisely to the binary mixture flowing in the other branch leads to a high investment in the rectification column, thus elevating the overall investment cost of the known apparatus.

Consequently, the invention is addressed to the object of eliminating the expense involved in the rectification column required for the operation of the known resorption-type thermal conversion apparatus, and thus to reduce substantially the investment cost of such apparatus.

Setting out from a thermal conversion apparatus of the kind described above, this problem is solved in accordance with the invention by providing in each high-pressure and low-pressure interconnecting conduit between the two circuits a pressure sensor and a temperature sensor whose signals are combined to form a measure of the concentration of the lower-boiling vaporous component of the binary working medium with respect to the total amount of the working medium in vapor form; by providing in one of the two interconnecting conduits a volumeter to measure the volume of the vaporous working medium flowing through them and providing a compensating conduit parallel to the interconnecting conduits, for flowing liquid working medium of varying concentration, a pressure sensor and temperature sensor plus a remotely controlled regulating valve being provided in the compensating conduit to detect the concentration level of the liquid working medium flowing therein, and by providing a central computer unit connected by signal lines to the measuring sensors and the volumeter, in which the signals proportional to the measured level, which are delivered through the signal lines, are continuously processed and converted to an actuating signal for the opening or closing of the control valve in the compensating conduit, the aperture of the control valve being thereby varied such that the volumetric difference in the vaporous working medium flowing between the two circuits is compensated. In the apparatus of the invention, therefore, the rectification column is eliminated, and at first it is accepted that unequal volumes of vaporous working medium of different concentrations are flowing through the high-pressure and low-pressure interconnecting conduits. The compensation of the volumetric difference is achieved by a compensating flow of liquid working medium parallel and in addition to the other interconnecting conduit, which is volumetrically controlled according to the different concentrations of the working medium flowing in the two interconnecting conduits and the volume of the working medium flowing in one of the interconnecting conduits, allowance being made also for the concentration of the working medium in the compensating current. The computation of the volume of the compensating current and its adjustment by an appropriate opening or closing of the control valve is performed continually by the central computer unit.

If the thermal conversion apparatus of the invention is a heat pump (or refrigeration machine), the configuration is made preferably such that the compensating conduit and the volumeter in the interconnecting conduit on the high-pressure side between the circuits, are disposed parallel to the interconnecting conduit on the low-pressure side.

If the thermal conversion apparatus, however, is in the form of a heat transformer, the configuration is made preferably such that the volumeter is disposed in the interconnecting conduit between on the low-pressure side and the compensating conduit is disposed parallel to the interconnecting conduit on the high-pressure side.

The invention will be further explained in the following description in conjunction with the drawing, wherein.

Figure 1:
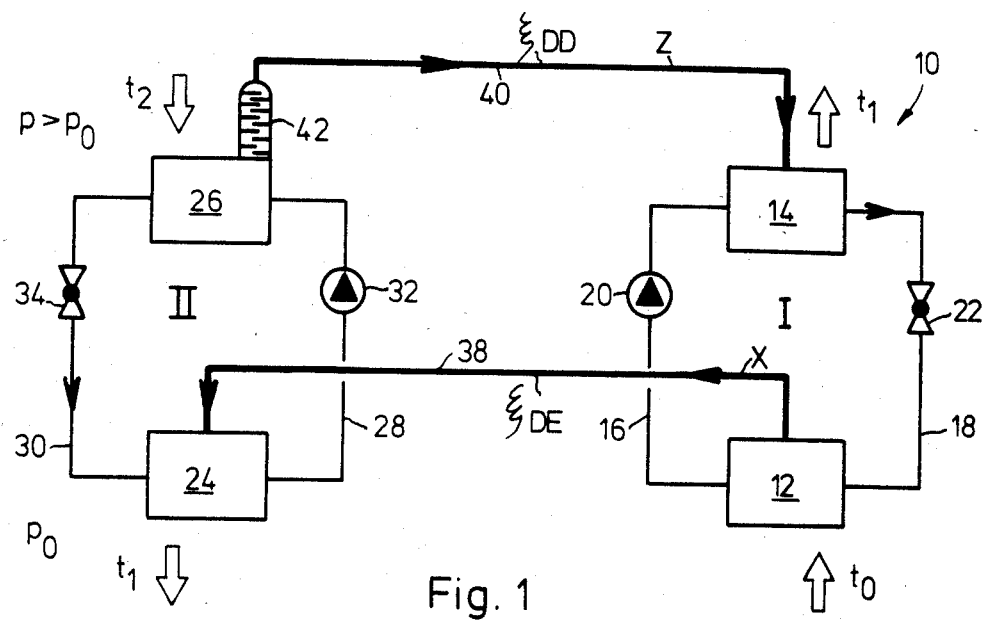
FIG. 1 is a schematic diagram of a resorption heat pump of known construction.

From the basic circuitry of a known absorption heat pump 10 shown in FIG. 1 it is apparent that it has two internal circuits I and II for working medium: in circuit I (on the right side of the figure) a degasser 12 and a resorber 14 are connected together by lines 16 and 18 with the inserted solvent pump 20 in the one case and flow restrictor 22 in the other, and in circuit II (on the left side of the figure) an absorber 24 and desorber 26 are connected together by lines 28 and 30 with the inserted solvent pump 32 in the one case and flow restrictor 34 in the other. In the degasser 12 of the first circuit and in the absorber 24 of the second circuit, the working medium is under a low pressure p0, while in the resorber 14 and in desorber 26 it is held at a higher pressure p.

The internal circuits I and II of the heat pump 10 are connected to one another by a first interconnecting conduit 38 connecting the degasser 12 to the absorber 24, and a second connecting line 40 on the high-pressure side connecting the desorber 26 to the resorber 14, a rectification column 42 being inserted between the interconnecting conduit 40 and the desorber 26 on the high-pressure side.

The energy available at the lower temperature level t0 is utilized in the degasser 12 for the purpose of driving out of the liquid working medium, i.e., the ammonia and water mixture, the more volatile component, i.e., ammonia, which forms in an amount x with the concentration $\xi_{DE}$ and flows through conduit 38 to the absorber 24, where it is reabsorbed in the liquid working medium of circuit II while yielding energy at the desired higher temperature level t1. The concentration of the liquid working medium flowing in circuit II is therefore increased accordingly in the absorber 24. By means of the solvent pump 32, the working medium of increased concentration is then elevated to the pressure p and delivered to the resorber 26 in which the more volatile component (ammonia) is again desorbed with an input of energy of a temperature t2, and flows through the rectification column 42 into the interconnecting conduit 40 and through the latter at the rate of flow z and the concentration $\xi_{DD}$ to the resorber 14, while the remaining liquid part of the working medium flows back to the absorber 24 through line 30 to the absorber 24, and in the flow restricting means 34 is expanded again to the pressure p0. In the resorber 14, the gaseous component of the working medium fed through line 40 is resorbed in the liquid working medium of circuit I with a yielding of energy (at the temperature level t1), and then flows back through line 18 to the degasser 12, while it is expanded in the flow constrictor 22 from the pressure p to the pressure p0. In the degasser again a part of the volatile component is driven out and, in the manner previously described, is delivered through interconnecting conduit 38 to the absorber 24, while the remaining portion of the liquid working medium flowing out of the degasser and again having a reduced concentration is increased in pressure by the solvent pump 20 and pumped to the resorber 14.

The circuit described can be continually sustained only if, in addition to the energy difference, the volumetric difference of the working medium flowing in the system is compensated while assuring that the working medium, in the individual operating components of the heat pump, i.e., in degasser 12, adsorber 24, desorber 26 and resorber 14, has the necessary concentrations at the existing pressure levels, and that these concentrations are also constantly sustained. It is readily apparent that this condition for a continuous operation of the heat pump is fulfilled only when the volume x and the concentration $\xi_{DE}$ of the working medium flowing through the interconnecting conduit 38 are equal to the volume z and concentration $\xi_{DD}$ of the working medium returning through interconnecting conduit 40. That is, the equations are:

$$x = z$$

$$\xi_{DE} = \xi_{DD}$$

The continuous performance of the process such that these conditions are constantly maintained is especially difficult because in the desorber 26, due to the input of heat energy t2, a relatively high content of water vapor emerges from the ammonia-water mixtures used as the working medium in addition to the more volatile ammonia. The rectification column 42 connected to the output of the desorber 26 thus serves for concentrating the ammonia to a concentration corresponding to that of the working medium flowing in the interconnecting conduit 38, by condensing the water vapor and returning it to the desorber. It is clear that, in addition to the rectification column indicated only schematically in the drawing, provision must also be made of a means for controlling the volumes x and z as well as the concentrations $\xi_{DE}$ and $\xi_{DD}$, such means having been omitted from this merely schematic drawing for the sake of simplicity.

Figure 2:
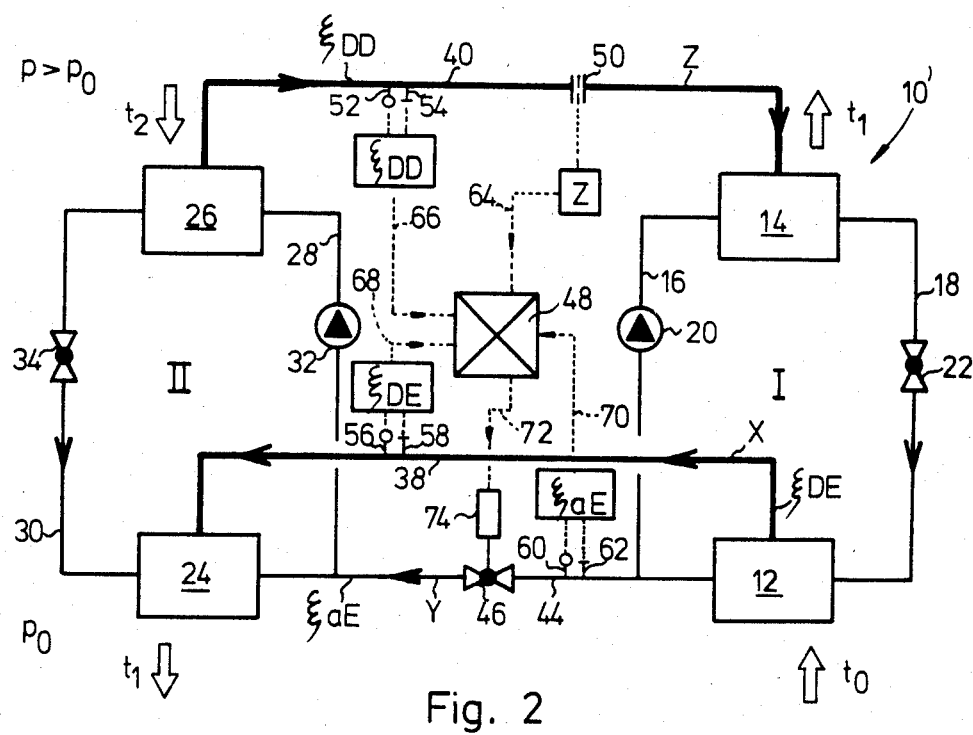
FIG. 2 is a schematic diagram of a heat pump differing in the manner of the invention from the heat pump illustrated in FIG. 1.

In FIG. 2, on the other hand, there is represented a heat pump 10' configured in accordance with the invention, which is similar in its basic operation to the heat pump described above, and in which the rectification column 42 is eliminated, so that the concentration $\xi_{DD}$ of the lower-boiling component of the working medium flowing over in interconnecting conduit 40 to the resorber during the operation of the heat pump 10' will be, as a rule, lower than the concentration $\xi_{DE}$ in interconnecting conduit 38. Thus, an enrichment of ammonia would occur in circuit II and a reduction of ammonia in circuit I, if the concentration differences were not compensated, while simultaneously providing for the volumetric difference in the total amount working medium flowing between the circuits I and II. This is accomplished in the case of heat pump 10' by the fact that, on the low-pressure side, between the circuits I and II of the liquid working medium, a balancing conduit 44 is inserted, while a control valve 46 of variable internal cross section permits control of the amount of the liquid working medium of the concentration $\xi_{aE}$ flowing from circuit I to circuit II. To obtain a complete equalization of volume between the two circuits I and II while allowing for the different concentrations of the working medium flowing in the interconnecting conduits 38 and 40, as well as the balancing conduit 44, the operation of the control valve 46 is performed from a central processing computer unit 48 [in]which data on the momentary concentration values $\xi_{DD}$ $\xi_{DE}$ and $\xi_{aE}$ are continually entered, plus the volume z of the working medium flowing through interconnecting conduit 40 and are processed to form an actuating signal to adjust the aperture of the control valve 46. The concentration values can be determined mathematically through the measurement of the pressure and temperature of the working medium flowing in the conduit in question, while the volume of the working medium in line 40 can be determined, for example, by means of a differential pressure measurement in a Venturi nozzle or throttle, in a known manner. In FIG. 2, such a volumeter is represented schematically in the form of a throttle 50 in the interconnecting conduit 40. In like manner, the pressure and temperature sensors 52 and 54 in line 40, 56 and 58 in line 38, and 60 and 62 in balancing line 44, which are necessary for determining the concentration levels, are indicated schematically. The volume z determined in the volumeter 50, as well as the readings obtained at the pressure and temperature sensors and combined to give a concentration level, are then delivered through the signal lines 64, 66, 68 and 70, indicated in broken lines in FIG. 2, to the processing computer 48. The control of the aperture of the control valve 46 is then performed by the control signal converted in the computer, which through a signal line 72 operates the control valve 46. If y is the amount of liquid flowing in the balancing line 44, the mathematical condition for continuous operation of the heat pump will be:

$$y = z \frac{\xi_{DE} - \xi_{DD}}{\xi_{DE} - \xi_{aE}}$$

This equation for the heat pump, which allows for the above-mentioned condition of a balanced volume and concentration of the working medium exchanged between the circuits, is derived in the following manner:

Mass balance $x+y=z$ (for the total amount)     (1)

$x \xi_{DE} + y \xi_{aE} = z \xi_{DD}$ (for the amount of ammonia)     (2)

If (1) is inserted into (2), we obtain $x \xi_{DE} + (z-x)\xi_{aE} = z \xi_{DD}$ This gives:

$$x = z \cdot \frac{\xi_{DD} - \xi_{aE}}{\xi_{DE} - \xi_{aE}} \quad (3)$$

On the basis of (1) and (3):

$$y = z - x = z - z \frac{\xi_{DD} \xi_{aE}}{\xi_{DE} \xi_{aE}}$$

After transformation, this gives the equation stated above.

Figure 3:
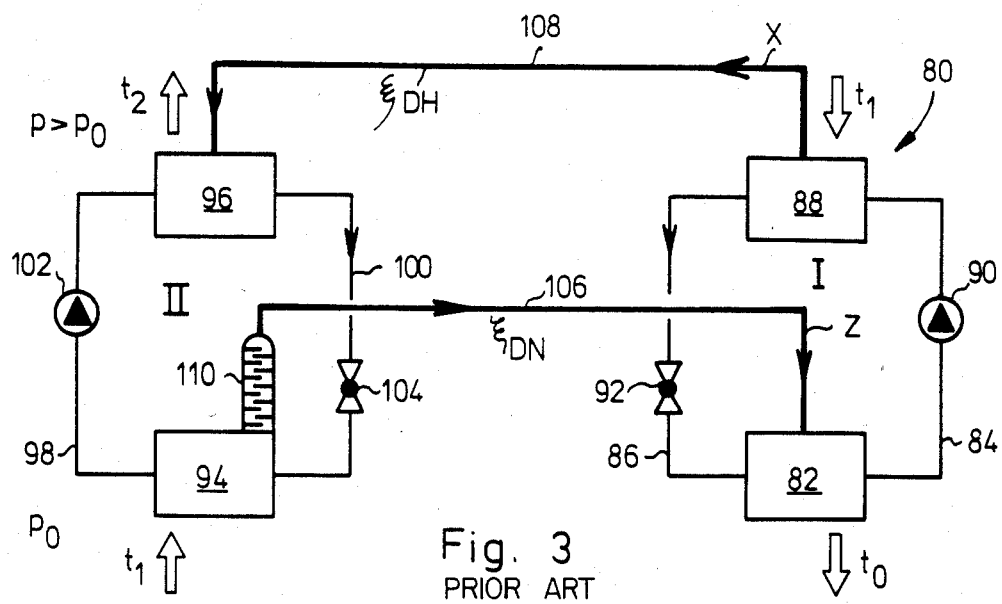
FIG. 3 is a schematic diagram of a heat transformer of known design, operating on the resorption principle.
Figure 4:
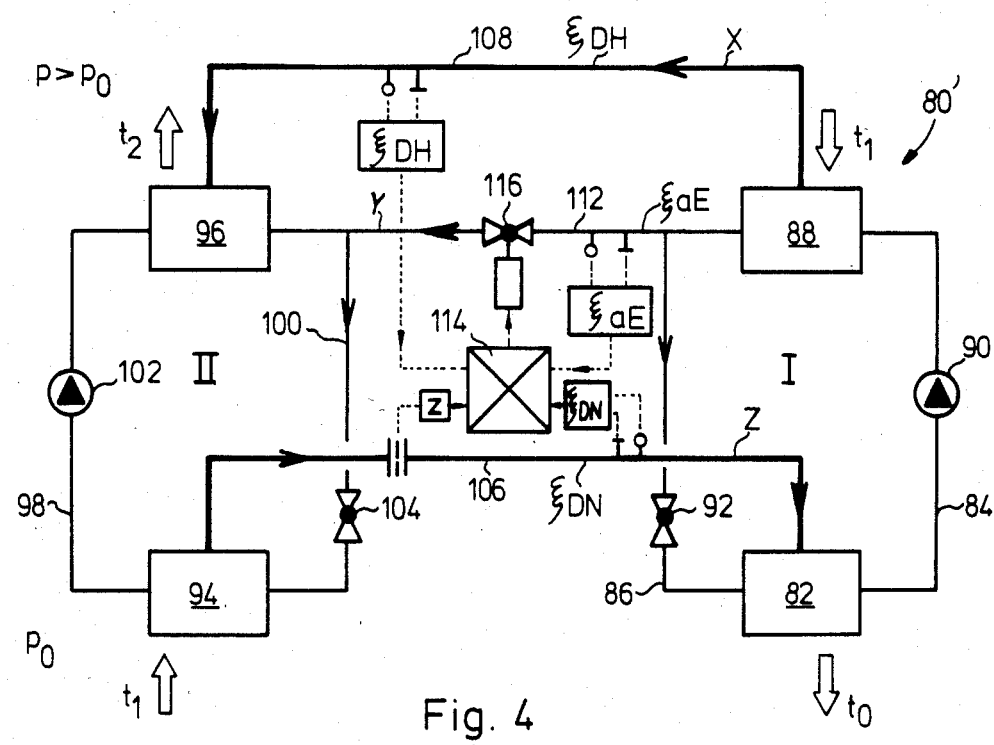
FIG. 4 is a circuit diagram of a heat transformer modified in the manner of the invention from the heat transformer illustrated in FIG. 3.

With the aid of FIG. 3, showing the construction of a conventional heat transformer 80, and FIG. 4, showing that of a heat transformer 80' improved in the manner of the invention, it is apparent that the invention described above in conjunction with the heat pump 10' can also be applied to the heat transformers operating on the resorption principle.

According to the circuit of the known heat transformer 80, represented in FIG. 3, this transformer also has two circuits I and II in which, on the one side, an absorber 82 on the low-pressure side is connected by lines 84 and 86 to a degasser 88 on the high-pressure side to form an internal circuit I of liquid working medium, while a solvent pump 90 and a flow constriction 92 are provided in lines 84 and 86, respectively. In circuit II, a degasser 94 on the low-pressure side is connected by lines 98 and 100 to a resorber 96 on the high-pressure side, a solvent pump 102 and a flow constriction 104 again being inserted into lines 98 and 100, respectively. The absorber on the low-pressure side of circuit I and the degasser of circuit II are connected by an interconnecting conduit 106, and the degasser on the high-pressure side of circuit I is connected with the resorber of circuit II by an interconnecting conduit 108. The rectification column 110 serving to compensate for differences in concentration in the gaseous working medium (concentration $\xi_{DN}$) flowing on the low-pressure side from the degasser 94 to the absorber 82 and in the gaseous working medium (concentration $\xi_{DH}$) flowing on the high-pressure side from the degasser 88 to the resorber 96 is in this case connected between the degasser 94 of the low-pressure side and the interconnecting conduit 106.

The condition for the continuous operation of the heat transformer is that the volume and concentration of the working medium flowing through the interconnecting conduit 106 from the degasser 94 of the low-pressure side to the absorber 82 on the low-pressure side is equal to the volume and concentration of the gaseous working medium flowing from the degasser 88 of the high-pressure side to the resorber 96.

In the circuit shown in FIG. 4, of the heat transformer 80' improved in the manner of the invention, the rectification column 110 of the known heat transformer, corresponding to the heat pump 10' described in conjunction with FIG. 2, is replaced by a computer-controlled balancing circuit system, in that a balancing line 112 having a control valve steplessly controlled by a central processing unit 114 is provided between the circuits I and II, parallel to the interconnecting conduit 108 on the high-pressure side. Again, the concentration values $\xi_{DN}$, $\xi_{DH}$ and $\xi_{aE}$ determined by the pressure and temperature sensors in the interconnecting conduits 106 and 108 and in the balancing line 112 are fed to the computer unit 114, as well as the volume z of the working medium flowing in interconnecting conduit 106. The computer unit 114 again converts the received data to a signal for the operation of the control valve 116, which controls the flow of the liquid working medium through balancing line 112 in the manner necessary so that any differences in volume and concentration in circuits I and II are compensated and thus the heat transformer 80' is maintained in continuous operation.

The condition necessary for the maintenance of the continuous operation of the heat transformer of the invention is thus:

$$y = z \frac{\xi_{DH} - \xi_{DN}}{\xi_{DH} - \xi_{aE}}$$

wherein y is the volume of the liquid working medium flowing in the balancing line 112 with the concentration $\xi_{aE}$, while $\xi_{DH}$ is the concentration of the gaseous working medium flowing in the interconnecting conduit 108 on the high-pressure side, and $\xi_{DN}$ is the concentration of the gaseous working medium flowing in the interconnecting conduit 106 on the low-pressure side.

The equation for the heat transformer is derived, like the equation for the heat pump, as follows:

Mass balance:

$x+y=z$ for the total amount)     (1)

$$x\xi_{DH} + y\xi_{aE} = z\xi_{DN} \text{ (for the total amount of ammonia)} \quad (2)$$

By inserting (1) into (2), we obtain $$x\xi_{DH} + (z-x)\xi_{aE} = z\xi_{DN}$$

From this we obtain $$x = z\frac{\xi_{DN} \xi_{aE}}{\xi_{DH} \xi_{aE}}$$

On the basis of (1) and (3):

$$y = z - x = z - z\frac{\xi_{DN} - \xi_{aE}}{\xi_{DH} - \xi_{aE}}$$

from which, by conversion, the above-given equation is obtained.

I claim:

1. Resorption-type thermal conversion apparatus, such as a heat pump, refrigeration machine or heat transformer, which is operated with a binary working medium, especially a mixture of ammonia and water, in order to raise to a higher temperature level the thermal energy supplied from an external thermal energy source, the apparatus having two solvent circuits in which the working medium in liquid phase is brought from a lower to a higher pressure level and is expanded again to the lower pressure level, and between the two circuits, both on the low-pressure and on the high-pressure side, an interconnecting conduit exists in which working medium that is in the vapor phase passes over, characterized in that, in the interconnecting conduit (40; 38; 108; 106) on the high-pressure and low-pressure sides, a pressure sensor and a temperature sensor (52, 54; 56, 58) are provided in each, whose data are combined to form a measure of the concentration of the lower-boiling, vaporous component of the binary working medium with respect to the total vaporous volume of the working medium, that in one of the two interconnecting conduits a volumeter (50) is provided for the volume of the vaporous working medium flowing through it, and a balancing conduit (44; 112) is provided parallel to the interconnecting lines for flowing liquid working medium of different concentration, a pressure measuring sensor and a temperature measuring sensor (60; 62) being also provided in the compensating conduit for determining the concentration of the liquid working medium flowing therein, and additionally a remotely operated control valve (46; 116), and that a central computer unit (48; 114) connected to the measuring sensors and the volumeter is provided, in which the signals proportional to the measured value delivered through the signal lines are continuously processed and converted to an actuating signal for the opening or closing of the control valve (46; 116) disposed in the compensating conduit (44; 112), and which controls the aperture of the control valve (46; 116) such that the volumetric difference of the vaporous working medium flowing between the two circuits (I; II) is compensated.

2. Heat pump of claim 1, characterized in that the volumeter (50) is disposed in the interconnecting conduit (40) on the high-pressure side is disposed between the circuits (I; II) and the compensating conduit (44) is disposed parallel to the interconnecting conduit (38) on the low-pressure side.

3. Heat transformer of claim 1, characterized in that the volumeter is disposed in the interconnecting conduit (106) on the low-pressure side between the circuits (I; II), and the compensating conduit (112) is disposed parallel to the interconnecting conduit (108) on the high-pressure side.

* * * * *